2,899,382
CATALYST AND PROCESS FOR THE CONVERSION OF HYDROCARBONS

John W. Myers, Bartlesville, Okla., assignor to Phillips Petroleum Company, a corporation of Delaware No Drawing. Application September 7, 1954
Serial No. 454,611

18 Claims. (Cl. 208—138)

This invention relates to a new and improved catalyst and to a process for the conversion of hydrocarbons to more desirable hydrocarbons in contact with said catalyst. The process of the invention is applicable to the reforming of petroleum distillates, dehydrogenation of naphthenes, isomerization of alkylbenzenes such as xylenes, etc.

Numerous processes have been proposed for the conversion or reforming of hydrocarbon fractions boiling within the motor fuel or naphtha range to increase the aromaticity and improve the anti-knock characteristics of said hydrocarbon fraction. These processes generally involve a number of simultaneously occurring reactions, such as isomerization, dehydrogenation, aromatization, and selective cracking. Such processes comprise the steps of passing a hydrocarbon fraction with or without added hydrogen over a reforming catalyst at elevated temperatures. The catalysts involved include a majority of the elements of the periodic table in various combinations, including platinum or palladium supported on a cracking catalyst, such as silica-alumina, or the like. While a number of these catalysts have been found to be effective, many have not been commercially adopted because they do not possess some of the desirable and necessary qualities of commercially feasible catalysts such as long life, immunity to poisoning, and ease of regeneration. The catalyst of the invention, hereinafter described, is effective in catalyzing the aforesaid reactions to effect improved yields and has the desired characteristics for commercial processes.

The xylenes, namely orthoxylene, metaxylene, and paraxylene are important chemicals and find wide and varied application in industry. In some of these applications one of these specific isomers of xylene is very often superior to the other isomers or to mixtures of isomers. Unfortunately, the isomers of xylene and ethylbenzene are nearly always obtained as mixtures and the separation of the individual isomers from such mixtures is difficult and costly. Paraxylene is very often more desirable than the other xylene isomers and isomerization processes have been devised to isomerize ortho- and metaxylene and ethylbenzene to paraxylene. It is well known that xylenes can be isomerized by the use of such catalysts as aluminum chloride, boron fluoride, liquid hydrogen fluoride, and the like; however, processes employing these catalysts involve long contact times, cause a substantial amount of disproportionation of the feed, and result in low yields.

The objects of the invention comprise the following: to provide a novel and improved catalyst for the conversion of hydrocarbon material; to provide an improved process for catalytically converting hydrocarbon material to more desirable hydrocarbons in improved yield; to provide an improved process for reforming petroleum distillates boiling in the gasoline range to form motor fuels of higher anti-knock rating in high yield; to provide an improved process for isomerizing alkyl aromatic hydrocarbons, such as xylenes and ethylbenzene; and to provide an improved process for isomerizing hydrocarbons present in petroleum distillates boiling in the range of 100–400° F. Other objects of the invention will become apparent from a consideration of the accompanying disclosure.

The catalyst of this invention comprises a mixture of small, discrete particles of silica-alumina and a less active component such as alumina and/or silica gel impregnated with platinum or palladium. Other relatively inert cracking components include zirconia, titania, thoria, and magnesia. The catalyst may be formed by first forming a mixture of finely divided silica-alumina and less active support material, forming the support material into the desired shape and impregnating the support with platinum or palladium. Alternatively, the catalyst may be formed by separately impregnating the finely divided support materials with platinum or palladium, and then mixing the two separately impregnated materials together and forming the final catalyst shape.

This catalyst may be produced by any of several specific methods, the principal requirement being that the final catalyst be composed of a finely divided mixture of discrete particles of the silica-alumina and less active component, both impregnated with a suitable quantity of platinum and/or palladium. One suitable method is to mill together in a ball mill a quantity of silica-alumina and a quantity of the less active component, for example, alumina. At least one of the two components of the catalyst support should be calcined before the components are milled together. The finely divided mixture of the two materials is then pelleted, calcined, impregnated with chloroplatinic acid, heated to decompose the chloroplatinic acid, and reduced before use in the hydrocarbon conversion process.

A second method which may be used for the preparation of the catalyst is to calcine the silica-alumina, mill the material to finely divided form, and mix thoroughly with a similarly treated alumina, pellet the mixture and treat the pellets by calcination and impregnation as described in the previous paragraph. The catalyst may also be prepared by separately milling the two calcined support materials, impregnating each material separately with chloroplatinic acid, calcining to decompose the chloroplatinic acid to finely divided platinum, thoroughly mixing the two impregnated supports to a uniform mixture, and pelleting and calcining the pellets to form a catalyst in suitable physical shape for reduction and use.

The catalyst support may be composed of silica-alumina in the range of 5–50 percent with the remainder being the less active component, silica and/or alumina. The platinum and/or palladium content of the catalyst should be in the range of 0.01 to 10 percent of the total catalyst, preferably 0.1 to 2 percent.

Silica-alumina, as used throughout the specification, denotes either the coprecipitated or the impregnated material in which the silica and alumina are firmly bonded to each other by the precipitation or by deposition from solution. The silica content of the silica-alumina portion of the catalyst support may vary considerably. In the case of a coprecipitate, the silica may be from 5–95 percent of the silica-alumina, preferably 40–95 percent. In case the silica-alumina used is a silica gel impregnated with alumina by deposition from aqueous solution, as little as about 0.1 to 0.2 percent alumina may be used in the silica-alumina portion. Silica-zirconia-alumina, silica-thoria-alumina, silica-magnesia, silica-magnesia-alumina, silica-titania-alumina, and the like, can be used in place of silica-alumina.

The less active portion of the support is preferably alumina although silica, zirconia, titania, thoria, and magnesia can be used. The alumina used may be either of the gamma or alpha form, each being satisfactory.

Any suitable method of adding the platinum or palladium to the catalyst can be used, several specific procedures being known. Addition of platinum as chloroplatinic acid followed by thermal decomposition is quite satisfactory.

The charge stocks utilized in reforming over this catalyst are principally petroleum distillates boiling between about 90 and 400° F. A desirable feed is a naphtha fraction boiling in the range of 150 to 350° F. Normally, these naphthas will contain an appreciable percentage of naphthene hydrocarbons which can be converted to aromatics. It is preferred that a substantial portion of the naphtha be in the $C_6+$ range, for it is this fraction where the naphthenes reformable to aromatics occur.

The conditions or reforming of naphthas are: weight hourly space velocity, 0.5 to 10, preferably 1 to 5; pressure, 100–1000 p.s.i.g., preferably 200–800 p.s.i.g.; temperature, 600–1000° F., preferably 700–1000° F.; and hydrogen/hydrocarbon mol ratio, 1 to 20, preferably 2 to 10.

The catalyst activity will decline with use, though the rate of decline depends to a great extent upon the exact conditions of reforming. This decline of activity is due to the deposition of carbonaceous deposits on the catalyst, and regeneration with an oxygen-containing gas such as air or diluted air will restore the activity. The preferred temperature range for the regeneration is 700–1100° F.

The reforming process may be carried out in fixed bed, fluid bed, or moving bed apparatus. The form of the catalyst used depends on the type of operation utilized, as is obvious to those skilled in the art. It may be used in pellet form or in finely comminuted form suitable for fluidizing.

The dehydrogenation of naphthenic hydrocarbons may be carried out in a manner similar to the reforming process, the principal difference between the two being only that the naphthenes are ordinarily of higher concentration in the feed in the napthene dehydrogenation process. Actually, naphtha dehydrogenation is one of the reactions occurring in the reforming of petroleum naphthas. The isomerization of aromatic hydrocarbons such as xylene may be carried out at similar conditions to naphtha reforming, although the lower range of the above-disclosed temperatures may be utilized advantageously.

The examples which follow show the unpredictable advantages of using the mixed support for the platinum and/or palladium catalyst of the present invention compared to platinum or palladium supported on silica-alumina or on a relatively inert support. These examples are illustrative of the invention and should not be construed so as to impose unnecessary limitations on the invention.

EXAMPLE 1

In the following data, catalyst "B" was a commercial platinum reforming catalyst comprising 0.4 percent platinum on HF-treated alumina. The fluorine content of the catalyst was 0.24 weight percent. The catalyst of the present invention is shown in the data also and is designated catalyst "A." This catalyst was made by ball milling together a portion of calcined silica-alumina (obtained from commercial pills identified in Example 2) with a portion of uncalcined alumina. Following the milling operation, the finely divided mixture was calcined, pelleted, calcined, impregnated with platinum, dried, calcined and reduced prior to use. Both of these catalysts were used in reforming runs prior to the runs shown, but each had substantially the same previous history. Catalyst "A" contained 0.4 percent platinum, 18.3 percent silica-alumina, and 81.3 percent gamma alumina. The run conditions and product yields follow. The feed to these runs was a 200–400° F. boiling range naphtha.

Table I

COMPARISON WITH COMMERCIAL PLATINUM REFORMING CATALYST

| Run No | 1 | 2 |
|---|---|---|
| Catalyst | A | B |
| Temperature, °F | 876 | 869 |
| LHSV | 3.1 | 3.0 |
| H/HC mol ratio | 6.6 | 6.7 |
| Pressure, p.s.i.g | 500 | 500 |
| Test length, hrs | 2 | 2 |
| Product yields, vol. percent of feed: | | |
| $C_5$ | 2.9 | 2.4 |
| $C_{6+}$ | 88.7 | 89.1 |
| Vol. percent Aromatics in $C_{6+}$ | 45.8 | 44.7 |
| Aromatic yield, vol. percent of feed | 40.6 | 39.8 |

EXAMPLE 2

The following data show a comparison of the results of reforming with the catalyst of the present invention, catalyst "D," and a platinum-impregnated silica-alumina catalyst, catalyst "C." The silica-alumina base catalyst was prepared by impregnating commercial coprecipitated 90% silica–10% alumina pills with aqueous chloroplatinic acid of the proper concentration to give a finished catalyst containing about 0.3 weight percent platinum. The impregnated pills were dried by placing them in a furnace at room temperature, gradually heating to 370° F., and maintaining at this temperature overnight. The catalyst was then heated to process temperature in a stream of hydrogen and the feed, a 150–270° F. naphtha, was passed over it. The catalyst of the present invention was prepared by mixing 88 weight percent of finely powdered alpha alumina and 12 weight percent of finely powdered silica-alumina (same as used in catalyst "C"), pilling the composite in the usual manner, and calcining the pills at a final temperature of about 1000° F. to remove the Sterotex. The calcined pills were impregnated with aqueous chloroplatinic acid to give a finished catalyst containing about 0.4 weight percent platinum. The impregnated pills were dried at 220° F. and heated to process temperature in hydrogen. The naphtha used as feed was a 220–270° F. fraction.

Table II

| Run No | 3 | 4 |
|---|---|---|
| Process Conditions: | | |
| Catalyst | C | D |
| Catalyst base | Si–Al | Si–Al+Al |
| Temperature, °F | 885 | 885 |
| Pressure, p.s.i.a | 415 | 465 |
| LHSV | 3.6 | 4.1 |
| $H_2$/HC, mol | 6.5 | 6.1 |
| Products, Weight percent: | | |
| Hydrogen | 1.5 | 1.6 |
| Methane | 0.2 | 0.3 |
| $C_2$ | 0.5 | 0.2 |
| $C_3$ | 8.1 | 1.1 |
| $C_4$ | 15.5 | 1.6 |
| $C_{5+}$ | 74.2 | 95.2 |
| Aromatic content of $C_{5+}$, LV percent | 51.6 | 40.7 |
| Aromatic yield, LV percent of feed | 36.4 | 37.5 |

EXAMPLE 3

The data in Table III compare the reforming characteristics of the 150–270° F. naphtha and 220–270° F. naphtha used in the tests of Example 2. The tests of this example show that the comparison of the two catalysts in Example 2 is indicative of the characteristics of the two catalysts, and the differences are not merely due to differences in feed stock and conditions.

Catalyst "B" is the commercial platinum reforming catalyst of Example 1. The exact composition of the platinum reforming catalyst "E" used in run No. 6 is unknown, but is similar in composition to catalyst "B."

Table III

| Run No | 5 | 6 | 7 |
|---|---|---|---|
| Catalyst | B | E | B |
| Charge Stock | 150-270 °F. naphtha | 220-270 °F. naphtha | 220-270 °F. naphtha |
| Experimental Conditions: | | | |
| Temperature, °F | 884 | 894 | 881 |
| Pressure, p.s.i. | 415 | 467 | 465 |
| LHSV | 3.67 | 4.0 | 4.0 |
| H₂/HC mole ratio | 7.0 | 5.0 | 6.0 |
| Products: | | | |
| C₄ and lighter | 6.9 | 7.2 | ¹ 8.9 |
| C₅ plus | 93.1 | 92.8 | ¹ 91.1 |
| C₅ plus product: | | | |
| Aromatics, LV Percent | 45.3 | 43.7 | 46.8 |

¹ Estimated—believed to be closer than ±1%.

The above runs show the similar conversion characteristics of the 150–270° F. naphtha and 220–270° F. naphtha and the reliability of the comparison in Example 2.

It is well known in the art that a platinum-on-alumina catalyst has low activity for reforming naphtha.

The above data show the catalyst of the present invention to have high reforming activity without objectionable cracking activity. The catalyst thus retains the desirable characteristics of each individual support material, but loses the undesirable characteristics of the individual support materials.

Certain modifications of the invention will become apparent to those skilled in the art and the illustrative details disclosed are not to be construed as imposing unnecessary limitations on the invention.

I claim:

1. A process for the catalytic conversion of hydrocarbon material which comprises contacting said material under conversion conditions with a catalyst comprising 0.01 to 10 weight percent of at least one metal of the group consisting of platinum and palladium intimately admixed with a support comprising discrete particles of active silica-containing cracking catalyst intimately admixed with discrete particles of catalyst support material relatively inert as a cracking component at least one of the support components having been calcined before admixture with the other and said cracking catalyst being in the range of 5 to 50 weight percent of the support, the balance being said relatively inert material.

2. A process for reforming a petroleum distillate boiling in the range of 90 to 400° F. which comprises contacting said distillate under reforming conditions with a catalyst consisting essentially of platinum in the range of 0.1 to 2 weight percent of the catalyst deposited on a support of finely comminuted synthetic silica-alumina admixed with finely comminuted alumina, at least one of said silica-alumina and alumina having been calcined before admixing with the other and the silica-alumina being in the range of 5 to 50 weight percent of the support.

3. The process of claim 2 wherein said petroleum distillate is a naphtha boiling in the range of 150 to 350° F.

4. The process of claim 1 wherein the silica-containing cracking catalyst comprises silica-alumina and includes at least one member of the group consisting of zirconia, titania, thoria, and magnesia; and said inert support material consists essentially of at least one member of the group consisting of alumina and silica.

5. The process of claim 1 wherein said hydrocarbon material is rich in alkyl aromatics, said conversion conditions are isomerizing conditions, and said inert support materal consists essentially of at least one member of the group consisting of alumina and silica.

6. The process of claim 5 wherein said alkyl aromatics comprise a mixture of xylenes of other than an equilibrium concentration.

7. The process of claim 1 wherein said hydrocarbon material is rich in naphthenes, nathphene dehydrogenating conditions are maintained, and said inert support material consists essentially of at least one member of the group consisting al alumina and silica.

8. A process for reforming a petroleum distillate boiling in the range of 90 to 400° F. which comprises contacting said distillate under reforming conditions including a temperature in the range of 700 to 1000° F., a pressure in the range of 100 to 1000 p.s.i.g., and a hydrogen to hydrocarbon mol ratio in the range of 1 to 20; with a catalyst consisting essentially of platinum in the range of 0.01 to 10 weight percent of the catalyst deposited on a support comprising essentially silica-alumina in the range of 5 to 50 weight percent of the support and at least one inert support material selected from the group consisting of alumina and silica, at least one of the components of said support having been calcined before mixing with the other.

9. The process of claim 8 wherein alumina is utilized as the inert component of the support.

10. A catalyst comprising 0.01 to 10 weight percent of at least one metal of the group consisting of platinum and palladium intimately admixed with a support consisting essentially of discrete particles of silica-alumina cracking catalyst in an amount in the range of 5 to 50 weight percent of the support intimately admixed with discrete particles of catalyst support material relatively inert as a cracking component, said inert material comprising the balance of said support at least one of the silica-alumina and relatively inert component having been calcined before mixing with the other.

11. A catalyst comprising 0.01 to 10 weight percent of at least one metal of the group consisting of platinum and palladium intimately admixed with a support comprising discrete particles of active silica-containing cracking catalyst also contaning at least one member of the group consisting of alumina, zirconia, titania, thoria, and magnesia, intimately admixed with discrete particles of catalyst support material, relatively inert as a cracking component, at least one of the silica-containing component and the relatively inert component having been calcined before mixing with the other.

12. The catalyst of claim 11 wherein the cracking catalyst component comprises synthetic silica-alumina and the relatively inert catalyst support material is synthetic alumina.

13. The catalyst of claim 11 wherein the cracking catalyst component comprises silica-alumina and the relatively inert catalyst support material is silica.

14. The catalyst of claim 10 wherein the relatively inert support material includes at least one member of the group consisting of alumina and silica.

15. The catalyst of claim 10 wherein said inert support material consists essentially of at least one member of the group consisting of alumina, silica, zirconia, titania, thoria, and magnesia.

16. A catalyst consisting essentially of platinum in the range of 0.1 to 2 weight percent of the catalyst deposited on a support of finely comminuted silica-alumina admixed with finely comminuted alumina, at least one of said silica-alumina and alumina having been calcined before mixing with the other and the silica-alumina being in the range of 5 to 50 percent of the support.

17. A method of preparing a catalyst which comprises forming an intimate admixture of powdered silica-alumina and at least one powdered support inert as a cracking component, at least one of the powdered materials having been calcined before forming said admixture and said silica-alumina comprising 5 to 50 weight percent of said support impregnating the powdered material with a reducible compound of at least one metal of the group consisting of platinum and palladium from an aqueous solution of same, said metal being in the range of 0.01 to 10 weight percent of the catalyst, and reducing said compound to metal.

18. The process of claim 17 wherein the inert support is at least one member of the group consisting of alumina and silica.

References Cited in the file of this patent

UNITED STATES PATENTS

| | | | |
|---|---|---|---|
| 2,343,295 | Bailie et al. | Mar. 7, 1944 |
| 2,385,326 | Bailey | Sept. 25, 1945 |
| 2,395,836 | Bates | Mar. 5, 1946 |
| 2,437,531 | Huffman | Mar. 9, 1948 |
| 2,444,965 | Thomas et al. | July 13, 1948 |
| 2,478,916 | Haensel et al. | Aug. 16, 1949 |
| 2,662,861 | Riblett et al. | Dec. 15, 1953 |
| 2,763,623 | Haensel | Sept. 18, 1956 |
| 2,780,603 | Burton | Feb. 5, 1957 |

UNITED STATES PATENT OFFICE

CERTIFICATE OF CORRECTION

Patent No. 2,899,382                                        August 11, 1959

John W. Myers

It is hereby certified that error appears in the printed specification of the above numbered patent requiring correction and that the said Letters Patent should read as corrected below.

Column 6, line 2, after "consisting" strike out "al"; line 61, after "50" insert -- weight --; line 65, after "support" insert -- material --.

Signed and sealed this 8th day of March 1960.

(SEAL)
Attest:

KARL H. AXLINE                                          ROBERT C. WATSON
Attesting Officer                                      Commissioner of Patents